United States Patent [19]
Kourtides et al.

[11] Patent Number: 5,296,288
[45] Date of Patent: Mar. 22, 1994

[54] PROTECTIVE COATING FOR CERAMIC MATERIALS

[75] Inventors: Demetrius A. Kourtides, Gilroy; Rex A. Churchward, San Jose; David M. Lowe, Hayward, all of Calif.

[73] Assignee: The United States of America as represented by the Administrator of the National Aeronautics and Space Administration, Washington, D.C.

[21] Appl. No.: 865,535

[22] Filed: Apr. 9, 1992

[51] Int. Cl.⁵ .............................................. B32B 18/00
[52] U.S. Cl. ...................... 428/262; 428/268; 428/289; 428/325; 428/331; 428/469; 428/920; 501/53; 501/133
[58] Field of Search ............... 428/262, 289, 325, 331, 428/469, 920; 501/53, 133, 154

[56] References Cited

U.S. PATENT DOCUMENTS

| | | | |
|---|---|---|---|
| 4,093,771 | 6/1978 | Goldstein et al. | 428/312 |
| 4,381,333 | 4/1983 | Stewart et al. | 428/312.6 |
| 5,066,330 | 11/1991 | Holcombe, Jr. | 106/287.34 |
| 5,079,082 | 1/1992 | Leiser et al. | 428/307.7 |

OTHER PUBLICATIONS

D. Mui and H. M. Clancy, "Development of a Protective Ceramic Coating for Shutter Orbiter Advanced Flexible Reusable Surface Insulation (AFRSI)", Ceramic Engineering and Science Proceedings, vol. 6, No. 7-8, pp. 793-805 (Jul.-Aug. 1985).

Primary Examiner—George F. Lesmes
Assistant Examiner—Christopher Brown
Attorney, Agent, or Firm—Darrell G. Brekke; Guy Miller; John R. Manning

[57] ABSTRACT

A protective coating for ceramic materials such as those made of silicon carbide, aluminum oxide, zirconium oxide, aluminoborosilicate and silicon dioxide, and a thermal control structure comprising a ceramic material having coated thereon the protective coating. The protective coating contains, in admixture, silicon dioxide powder, colloidal silicon dioxide, water, and one or more emittance agents selected from silicon tetraboride, silicon hexaboride, silicon carbide, molybdenum disilicide, tungsten disilicide and zirconium diboride. In another aspect, the protective coating is coated on a flexible ceramic fabric which is the outer cover of a composite insulation. In yet another aspect, a metallic foil is bonded to the outer surface of a ceramic fabric outer cover of a composite insulation via the protective coating. A primary application of this invention is as a protective coating for ceramic materials used in a heat shield for space vehicles subjected to very high aeroconvective heating environments.

20 Claims, 4 Drawing Sheets

PROTECTIVE COATING FOR CERAMIC MATERIALS

ORIGIN OF THE INVENTION

The invention disclosed herein was made in the performance of work under a NASA Contract and is subject to Public Law 96-517 (35 U.S.C. §200 et seq.). The contractor has not elected to retain title in this invention.

BACKGROUND OF THE INVENTION

1. Field of the Invention

This invention relates to a novel coating for use as a protective coating for ceramic materials such as ceramic fabrics made of silicon carbide, aluminum oxide, zirconium oxide, aluminoborosilicate and silicon dioxide. This invention also relates to a re-usable thermal control structure comprising a ceramic material as a s substrate having coated thereon the protective coating of this invention which provides excellent resistance to high temperatures and repeated thermal shock at temperatures up to 1650° C. In another aspect of this invention, the protective coating may be coated on a flexible ceramic fabric, which ceramic fabric is the outer cover of a composite insulation. In yet another aspect, the protective coating of this invention can also be utilized as a high temperature adhesive to bond metallic foils to ceramic fabrics and composite insulations. A primary application of this invention is as a protective coating for ceramic materials used in a heat shield for space vehicles subjected to very high aeroconvective heating environments.

To retain the thermal control structure for reuse capability under such space and atmospheric conditions, it was necessary to develop a high density protective surface coating. The requirements for this protective coating included a match of the thermal expansion with the substrate material and imperviousness to moisture, resistance to abrasion and mechanical damage, high emissivity at high temperatures in the critical wavelengths below 3 µm, capability of surviving cyclic heating to 1650° C., and good thermal shock, vibration and acoustic performance. Furthermore, the protective coating has to be applied thinly in order to retain the flexibility of a coated ceramic fabric and to avoid o excessive weight gain.

The present invention provides increased total hemispherical emissivity and decreased catalytic efficiency of the thermal control structure surface when subjected to a high temperature environment. Particularly, the protective coating of this invention lowers the surface temperature of the thermal control structure and reduces heat transfer through the surface so that the underlying ceramic material is protected from degradation.

2. Description of the Prior Art

Protective coatings suitable for use on ceramic insulations are known in the art. D. Mui and H. M. Clancy in "Development of a Protective Ceramic Coating for Shuttle Orbiter Advanced Flexible Reusable Surface Insulation (AFRSI)", *Ceramic Engineering and Science Proceedings*, Vol. 6, No. 7-8, pp. 793-805 (July-August 1985), disclose such compositions and structures which were proven to be successful on Space Shuttle flights. While these glass coatings have good physical and optical properties in the convective heating environment encountered during reentry, they are limited as follows:

(1) The protective coating of Mui and Clancy provides adequate protection only up to 1800° F. (982° C). (2) When heated above this temperature, cristobalite formation may result in a cracked coating. (3) The emittance of the coating is close to that of pure silicon dioxide, such that the coating does not enhance the emittance of the underlying fabric. Therefore, the temperature capability of the system is not increased.

The above described prior art coating typically contains two ingredients of known high purity, namely ammonia-stabilized colloidal silicon dioxide in deionized water, and ground silicon dioxide. The coating is easily applied on ceramic fabrics and insulations such as the Advanced Flexible Reusable Surface Insulation (AFRSI) used on the Space Shuttle Orbiter. This prior art coating can not be used on reentry space vehicles such as the Advanced Space Transfer Vehicle (ASTV), since it is unstable at the high temperatures (e.g., 1600 ° C.) which would be produced during reentry of these vehicles. The ASTV is described in Walberg, G. D., "A Survey of Aeroassisted Orbit Transfer", *J. Spacecraft & Rockets*, Vol. 22, No. 1 (January-February 1985).

On the other hand, the RCG (reaction cured glass) high temperature coating described in U.S. Pat. No. 4,093,771 was designed primarily for rigid ceramic insulations and is not suitable for flexible ceramic fabrics and insulations which must remain flexible during installation and reentry. In order to be effective as a protective coating, the above noted prior art coating must be fired for a minimum firing time of one hour. When this coating having a final weight of 0.07 g/cm² is fired on a ceramic fabric, the fabric becomes extremely fragile and non-flexible. This coating also requires an organic binder (e.g., methylcellulose) to hold itself together before firing. The organic binder will volatilize and coat adjacent surfaces in a space vehicle when the unfired coating is first heated.

The protective coating of U S. Pat. No. 4,093,771 typically contains two ingredients of known high purity, namely, borosilicate glass and silicon tetraboride. The coating is applied only on rigid ceramic insulations such as Fibrous Reusable Composite Insulation (FRCI) used on the Space Shuttle Orbiter. Furthermore, this coating relies on the oxidation of its emittance agent (i.e., silicon tetraboride) and the fluxing of the glass by the boron oxide to seal the coating and to prevent further oxidation. As discussed below, the present invention does not rely on this mechanism to seal the glass and therefore does not require firing prior to use.

Other coatings known in the art are the two layer coatings described in U.S. Pat. No. 4,381,333. These two layer coatings oonsist of a base Coating such as that described in U.S. Pat. No. 4,093,771 and a reflective surface overlay. The reflective surface overlay consists of fused silicon dioxide, borosilicate glass, and an organic carrier solution. These coatings, which are used primarily on rigid ceramic insulations, must be fired before use and suffer from the same limitations as discussed above when applied to flexible ceramic fabrics and insulations.

Thus, while the art of protective coatings for ceramic insulations is a well developed one, a need remains for further development of a lightweight surface coating especially adapted for use on heat shields for space vehicles subjected to extreme heating environments.

SUMMARY OF THE INVENTION

Accordingly, it is an object of this invention to provide a protective coating that improves the optical properties and thermal stability of ceramic materials at temperatures up to 1650° C.

It is another object of this invention to provide a thermal control structure comprising a ceramic material made of, e.g., silicon carbide, aluminum oxide, zirconium oxide, aluminoborosilicate (ABS) or silicon dioxide as a substrate (which materials suffer from strength degradation at temperatures greater than 1000° C.) and a protective coating on the ceramic material, the thermal control structure having improved thermal stability and optical properties at temperatures up to 1650° C.

It is another object of this invention to provide a protective coating which does not significantly degrade the flexibility of a flexible ceramic fabric when applied, and which protective coating can be applied prior to installation of the resulting thermal control structure onto a space vehicle.

It is yet another object of this invention to provide a protective coating having a significantly reduced loss of volatile components in a convective heating environment.

It is yet another object of this invention to provide a protective coating which does not significantly increase the weight of the coated ceramic material as compared to prior art coatings.

It is yet another object of this invention to provide a protective coating which when coated on a ceramic material to obtain a thermal control structure increases the total hemispherical emissivity and decreases the catalytic efficiency of the exposed surface, thereby decreasing the surface temperature of the thermal control structure when exposed to high heating environments.

It is yet another object of this invention to provide a reusable thermal control structure which is resistant to damage that is due to rapid changes in temperatures up to 1650° C.

It is yet another object of this invention to provide a protective coating which has a thermal expansion coefficient close to that of the coated ceramic material, to thereby preserve the resulting thermal control structure when subjected to high thermal stress environments.

It is yet another object of this invention to provide a protective coating which when applied to a composite insulation comprising a ceramic material as an outer cover lowers the thermal conductivity of the resulting thermal control structure.

It is yet another object of this invention to provide a protective coating which when applied to a ceramic material increases the erosion' vibroacoustic and aerodynamic resistance of the resulting thermal control structure.

It is yet another object of this invention to provide a protective coating which also serves as a high temperature adhesive to bond metallic foils to ceramic fabrics and composite insulations.

It is yet another object of this invention to provide a protective coating which also serves as a moisture barrier after exposure to the thermal environment, thus providing a thermal control structure which is resistant to moisture.

Other objects of this invention will become apparent from the following description and examples.

The present inventors have discovered that the above objectives are attained by a protective coating and a thermal control structure comprising a ceramic material having coated thereon a protective coating comprising, in admixture, silicon dioxide powder; colloidal silicon dioxide; water; and one or more emittance agents selected from the group consisting of silicon tetraboride, silicon hexaboride, silicon carbide, molybdenum disilicide, tungsten disilicide and zirconium diboride.

The high surface area of the colloidal particles contained in the protective coating of this invention is the main driving force for the fusion of the coating during heating. The colloidal particles sinter together and bond to the larger silicon dioxide and silicon hexaboride particles. The coating fuses at a temperature above that of RCG since it contains much less boron oxide. Consequently, the viscosity and thermal stability are increased relative to RCG. The silicon hexaboride particles are slightly oxidized during heating and form a thin surface layer of borosilicate glass which fluxes the surrounding silicon dioxide matrix and stabilizes it against devitrification. Even when the silicon hexaboride oxidizes, there is no weight loss by gas evolution since the dense silicon dioxide glass completely encloses the particles during heating. Therefore, the protective coating of this invention can be used to much higher temperatures due to its high emissivity, viscosity and stability against devitrification.

The microstructure of the protective coating of this invention prior to heating is compared with the coating of Mui and Clancy and that of the RCG coating of U.S. Pat. No. 4,093,771 in FIG. 1.

Figure 1A:
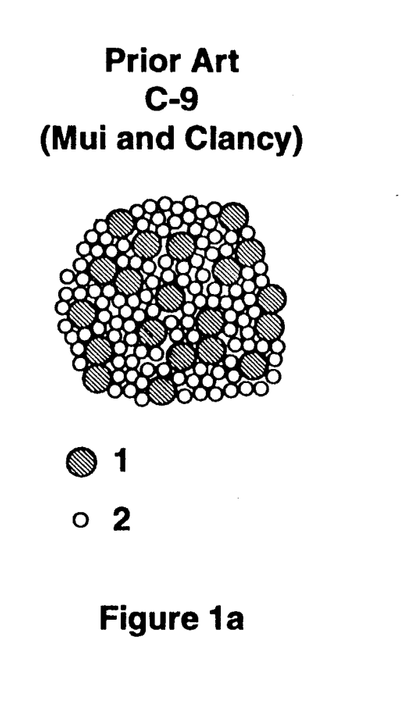
FIG. 1 depicts a conception of the microstructure of the protective coating of this invention prior to heating as compared with prior art coatings.
Figure 1B:
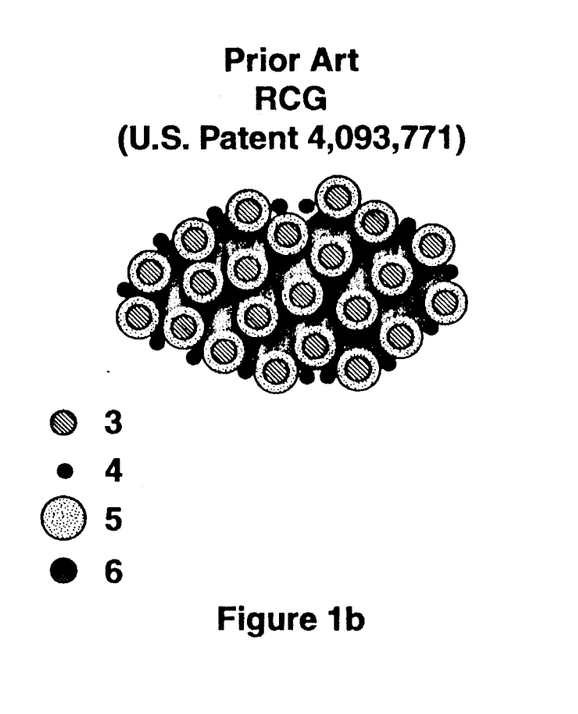
Figure 1C:
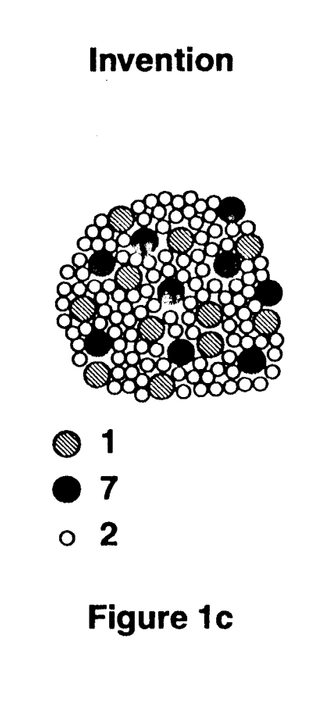

In reference to FIG. 1 the coating of Mui and Clancy contains $SiO_2$ powder 1 and colloidal silicon dioxide particles 2. The RCG coating of U.S. Pat. No. 4,093,771 contains high $SiO_2$ borosilicate glass powder 3, $SiB_4$ powder 4, borosilicate glass overlay 5 and methylcellulose binder 6. In a preferred embodiment, the protective coating of this invention contains silicon dioxide powder 1, colloidal silicon dioxide particles 2 and $SiB_6$ powder 7.

It is to be understood that both the foregoing general description and the following detailed description are exemplary and explanatory but are not to be construed as being restrictive of the invention.

DETAILED DESCRIPTION OF THE INVENTION

The silicon dioxide powder component of the protective coating of this invention has a hexagonal crystalline structure matching PDF 33-1161, and a particle size of from 1.0 to 2.0 μm, and preferably from 1.03 to 1.11. Furthermore, the silicon dioxide powder preferably has a specific gravity of from 2.17 to 2.66 and a melting point of from 1610° C. to 1728° C. With respect to impurities, the silicon dioxide powder for use in this invention preferably contains Al in an amount of 0.06 wt % or less, Ca in an amount of 0.01 wt % or less, Fe in an amount of 0.05 wt % or less, Mg in an amount of 0.02 wt % or less and Ti in an amount of 0.02 wt % or less based on the weight of the silicon dioxide powder. Silicon dioxide powder for use in this invention is commercially available, for example, as 99.9% silicon dioxide $SiO_2$, 325 mesh, from Cerac Corporation, Milwaukee, Wis.

The colloidal silicon dioxide component of the protective coating of this invention is a suspension of colloidal silicon dioxide particles in water. The water is preferably deionized water having a resistance of one megohm or greater. The colloidal silicon dioxide component contains silica (as $SiO_2$) preferably in an amount of from 35 to 45% by weight. The average particle diameter of the colloidal silicon dioxide particles is preferably from 20 to 24 nm, and the specific surface area of the colloidal silicon dioxide particles is preferably from 130 to 150 m$^2$/g. With respect to impurities, the colloidal silicon dioxide component preferably contains titratable alkali (as $Na_2O$) in the amount of 0.09 wt % or less, a $SiO_2/Na_2O$ ratio of 255 by weight or more, a sulfide content (as $Na_2SO_4$) of 0.005 wt % or less, a chloride content (as NaCl) of 0.002 wt % or less, and a $NH_3$ content of 0.16 wt % or less based on the weight of the colloidal silicon dioxide component. Colloidal silicon dioxide in deionized water for use in this invention is commercially available, for example, as Ludox AS, from du Pont Company, Wilmington, Del.

The emittance agent for use in this invention is selected from the group consisting of silicon tetraboride, silicon hexaboride, silicon carbide, molybdenum disilicide, tungsten disilicide and zirconium diboride. The emittance agent for use in this invention preferably is in the form of a powder having a particle size of from 4 to 7μm. Silicon hexaboride is preferred.

The silicon hexaboride ($SiB_6$) component of the protective coating of this invention has an orthorombic crystal structure matching PDF 35-809. The silicon hexaboride is preferably in the form of a powder having a particle size of from 5.0 to 6.0 μm, and preferably from 5.5 to 5.7 μm. The specific gravity of the silicon hexaboride powder is preferably from 2.43 to 2.47. With regard to impurities, the silicon hexaboride preferably contains Al in an amount of 0.04 wt % or less, Ca in an amount of 0.05 wt % or less, Cr in an amount of 0.03 wt % or less, Cu in an amount of 0.005 wt % or less, Fe in an amount of 0.01 wt % or less, Mg in an amount of 0.005 wt % or less and Mn in an amount of 0.01 wt % or less based on the weight of the silicon hexaboride. Silicon hexaboride powder for use in this invention is commercially available, for example, as 98% silicon hexaboride, $SiB_6$, 200 mesh, from Cerac Corporation, Milwaukee, Wis.

Other emittance agents for use in this invention are described below.

Silicon tetraboride for use in this invention is s commercially available, for example, as B-1088, from Cerac. Silicon carbide for use in this invention is commercially available, for example, as S-1058, from Cerac. Molybdenum disilicide for use in this invention is commercially available, for example, as M-1148, from Cerac. Tungsten disilicide for use in this invention is commercially available, for example, as T-1182, from Cerac. Zirconium diboride for use in this invention is commercially available, for example, as Z-1031, from Cerac.

The protective coating of this invention may further comprise aluminum oxide powder and/or colloidal alumina (added as a suspension of colloidal alumina particles in water) to increase the thermal expansion coefficient of the coating. Aluminum oxide powder having a particle size preferably of from 0.8 to 1.2 μm for use in this invention is commercially available, for example, as A-1187, from Cerac. Colloidal alumina having a particle size preferably of from 45 to 55 nm for use in this invention is commercially available, for example, as Nyacol A120 from Nyacol Products.

In a preferred embodiment, the protective coating of this invention does not contain an organic binder. Particularly, the colloidal particles contained therein hold the protective coating together and bind it to the ceramic material to be coated. As used herein, the term "organic binder" means a solution which contains an organic chemical compound.

The protective coating of this invention contains silicon dioxide powder in an amount of from 23.0 to 44.0 wt %, and preferably from 29.0 to 39.0 wt %. The protective coating contains colloidal silicon dioxide (as $SiO_2$) in amount of from 25.0 to 45.0 wt %, and preferably from 29.0 to 40.0 wt %. The protective coating contains silicon hexaboride in an amount of from 0.5 to 4.5 wt %, and preferably from 1.5 to 3.5 wt %. The protective coating contains water in an amount of from 19.0 to 39.0 wt %, and preferably from 23.0 to 35.0 wt %. The content of each component is given in terms of the total weight of the protective coating.

Aluminum oxide powder when added to the protective coating of this invention is contained in an amount of from 6.0 to 8.0 wt %, and preferably in an amount of from 6.8 to 7.0 wt %. Colloidal alumina when added to the protective coating of this invention is contained in the protective coating (as $Al_2O_3$) in an amount of from 1.0 to 20.0 wt %; and preferably in an amount of from 5.0 to 15.0 wt %. When the protective coating contains aluminum oxide powder or colloidal alumina, the colloidal silicon dioxide content (as $SiO_2$) is from 15.0 to 35.0 wt %, and more preferably from 20.0 to 30.0 wt %. The silicon hexaboride content is then from 0.5 to 3.5 wt %, and preferably from 1.0 to 3.0 wt %. The silicon dioxide powder and water content generally are unchanged.

The solids content of the protective coating of this invention is from 45 to 55% and preferably from 48 to 52% by weight of the total weight of the protective coating.

Deionized water having a resistance of 1 megohm or greater is preferably used for preparing the protective coating of this invention.

As an example, a preferred formulation of the protective coating of this invention contains silicon dioxide powder in an amount of 33.8 wt %, colloidal silicon dioxide (as $SiO_2$) in an amount of 34.6 wt %, silicon hexaboride powder in an amount of 2.4 wt % and deionized water in an amount of 29.2 wt %. As a second example, a preferred formulation of the protective coating of this invention contains silicon dioxide powder in an amount of 33.8 wt %, colloidal silicon dioxide (as $SiO_2$) in an amount of 24.6 wt %, colloidal alumina (as $Al_2O_3$) in an amount of 10.0 wt %, silicon hexaboride powder in an amount of 2.4 wt % and deionized water in an amount of 29.2 wt %.

The protective coating of this invention can be prepared by first forming a slurry of the components of the protective coating, and then ball milling the slurry to provide a uniform solid dispersion. The slurry is then placed in an appropriate storage container (e.g., pint or quart plastic bottle) and rotated on a Kendall or equivalent mixer until just prior to application onto a ceramic material.

Ball milling requirements and conditions vary depending on the method of application. Generally, the slurry composition (mill base charge) is preferably about 50% by weight solids for all jar sizes. The remaining weight percentages are made up by the addition of deionized water. The ball charge and the mill base charge percentages are generally independent of the jar size and the milling time. The amount of mill base charge used is based on the volume of the jar. An appropriate jar speed, in rpm, can be calculated using the following equation where R is the inside radius of the jar, in inches, and $rpm_0$ is the optimum speed for the jar.

$$rpm_0 = (127.6463 - 0.9385\ R)/\sqrt{R}$$

A ball mill for use in this invention, for example, is a variable speed roller type jar mill commercially available from Fisher Co., Model No. 784V. Exemplary s ball mill requirements and conditions are set forth in Tables A0-A2 below, however, this invention should not be construed as being limited thereto.

TABLE A0

| | |
|---|---|
| Jar Size: | 00, (1100 ml) |
| Ball Charge: | 50% by volume of Jar, 341 Cylinders |
| Mill Base Charge: | 50% by volume of jar, (550 ml) |
| Jar Speed: | 81 ± 2 rpm |
| Milling Time: | about 5 hrs. |

TABLE A1

| | |
|---|---|
| Jar Size: | 000, (250 ml) |
| Ball Charge: | 50% by volume of jar, 77 Cylinders |
| Mill Base Charge: | 50% by volume of jar, (125 ml) |
| Jar Speed: | 112 ± 2 rpm |
| Milling Time: | about 5 hrs. |

TABLE A2

| | |
|---|---|
| Jar Size: | 1, (5000 ml) |
| Ball Charge: | 50% by volume of jar, (1550 cylinders) |
| Mill Base Charge: | 50% by volume of jar, (2500 ml) |
| Jar Speed: | 61 ± 2 rpm |
| Milling Time: | about 5 hrs. |

The cylinders for the ball mill can be, for example, 1.3 cm × 1.3 cm ($\frac{1}{2}" \times \frac{1}{2}"$) carborundum or aluminum oxide cylinders.

The mixture of coating components is ball milled preferably for about 4.9 to 5.1 hours. The ball milled mixture may be coated on the ceramic material, for example, by spraying, dipping or brushing. After coating, the article is dried for about 1 to 4 hours at temperatures ranging from about 20° C. (room temperature) to about 200° C. For example, the coated ceramic material can be left to dry in air, dried with a heat gun, or placed in a drying oven.

The final weight of the dry coating is from 0.01 $g/cm^2$ to 0.10 $g/cm^2$, and preferably from 0.01 to 0.03 A dry coating weight of about 0.02 $g/cm^2$ is especially preferred. The surface thickness of the dry coating is preferably from 0.08 to 0.012 mm, and preferably has a uniformity (standard deviation/average thickness) of ±10%.

Prior to coating, the ceramic material is preferably heat cleaned at about 400° C. for four hours and then cooled prior to being coated in order to remove any organic materials which may reduce the adherence of the protective ceramic coating thereto.

When using a spray gun to apply the protective ceramic coating of the present invention to a ceramic material, the spray gun is held perpendicular to the surface of the substrate. A single coat may be made up of a number of overlapping passes, depending on the area o of the surfaces to be sprayed. Each applied coat may be dried using a heat gun before the next coat is applied. The passes for each coat are applied perpendicular to the passes of the previous coat (e.g., cross hatching pattern), except on the sides of the ceramic material. Additional coats can be applied until the slurry for the entire application is consumed.

A spray gun for use in applying the protective coating of this invention may be a Binks Model #69 with a Type 66 nozzle set for a 2.54 cm fan at a distance of approximately 5 cm from the substrate. The spraying pressure is set at about 25 psi gauge with only clean air or nitrogen used as the carrier gas. On the other hand, the protective coating may be applied using an air brush such as a Binks Wren Type C with Type 59-101 nozzle set for the maximum amount of fan. The air brush is held at a distance of approximately 2 cm from the substrate. The spraying pressure is set at about 25 psi gauge with only lo clean air or nitrogen used as the carrier gas.

The coated ceramic material is preferably uniformly coated such that all filaments, yarns and threads of the ceramic material are completely covered.

The ceramic material for use in this invention is a fibrous ceramic material in the form of, e.g., a fabric, felt, thread, tow, woven yarns, yarns of various deniers or interlock fabric. The ceramic material is preferably flexible when in the form of a fabric, and generally has a thickness of from 0.025 to 0.065 cm.

The definitions with respect to denier, filament, thread, tow, yarn, etc. as described in "Standard Methods of Testing Sewing Threads ASTM D 204", Vol. 07.01, *American Society of Testing Materials* (1983) are specifically incorporated herein by reference.

As used herein, the term "fibrous" means an arrangement of multiple single filaments to form a yarn, tow, thread, felt, or fabric, and the term "flexible" means a fibrous structure which is not rigid.

The ceramic fibers constituting the ceramic material of this invention include, for example, silicon carbide fibers, aluminum oxide fibers, zirconium oxide fibers, aluminoborosilicate (ABS) fibers and silicon dioxide fibers, etc. The fiber dimensions are not particularly limited, although a fiber diameter of from 3 to 15 μm and an aspect ratio of the fibers of from $3.5 \times 10^{-5}$ to $4.3 \times 10^{-5}$ can generally be employed.

Examples of useful ceramic fibers constituting the ceramic material of this invention include Zircar zirconium dioxide fibers (or felt); silicon nitride fibers; Nicalon "Ceramic Grade" silicon carbide fibers manufactured by Nippon Carbon of Japan; Tyranno silicon carbide fibers made by Ube Industries of Japan; SCS-2,6,8 silicon carbide on carbon filaments made by Textron; Saphikon aluminum oxide fibers; Nextel Z11 zirconium silicate fibers made by 3M; Saffil aluminum silicate fibers made by I.C.I., Altex aluminum silicate fibers made by Sumitomo; Almax aluminum oxide fibers made by Mitsui Mining; FP aluminum oxide fibers made by du Pont; PRD-166 zirconium aluminate fibers made by du Pont; HPZ on tungsten filaments made by British Petroleum; Fiberamic silicon carbide fibers made by Dow Corning; Sigma silicon carbide fibers made by Rhone-Poulenc; boron nitride fibers made by Electroceramics; and silicon carbide and silicon nitride whiskers.

Other useful fibers include silicon dioxide fibers, at least 99.6% pure, manufactured by Johns Manville and commercially available as Microquartz 108 fibers; Nextel 312 (an ABS fiber) produced by the 3M Company containing 62±2% aluminum oxide, 14±2% boron oxide, and 24±2% silicon dioxide; Nextel 440 and 480 ABS fibers made by 3M; and FRCI (U.S. Pat. No. 4,148,962) made from ABS fibers ranging in diameters from 3 to 12 μm.

Different kinds of fibers may be used in combination to prepare the ceramic material. Preferred combinations include silicon carbide and aluminoborosilicate fibers.

The protective ceramic coating of this invention may be coated on a ceramic material as a substrate to provide a thermal control structure. The protective coating of this invention may also be coated on a flexible ceramic fabric made of, e.g., silicon carbide, silicon dioxide, aluminum oxide or aluminoborosilicate, which ceramic fabric is the outer cover of a composite insulation such as Composite Flexible Blanket Insulation (CFBI), Tailorable Advanced Blanket Insulation (TABI) and Advanced Flexible Reusable Surface Insulation (AFRSI), or which coated ceramic fabric is used in the gaps between rigid ceramic tiles. CFBI is described in Kourtides et al, "Composite Flexible Insulation for Thermal Protection of Space Vehicles", NASA Technical Memorandum 103836 (February, 1991) and in U.S. Pat. No. 5,038,693. AFRSI is described in B. Mui and H. M. Clancy, "Development of a Protective Ceramic Coating for Shuttle Orbiter Advanced Flexible Reusable Surface Insulation (AFRSI)", *Ceramic Engineering and Science Proceedings*, Vol.6, No. 7-8, pages 793-805 (July-August 1985). TABI is described in NASA Contractor Report 177444, "Development of Tailorable Advanced Blanket Insulation for Advanced Space Transportation Systems" (April 1987).

As used herein, the term "composite insulation" means an insulation system which is composed of more than one component.

A ceramic material coated with the protective coating of this invention increases the emissivity and decreases the catalytic efficiency of the resulting thermal control structure. The thermal control structure is thus protected from oxidation and has enhanced strength when subjected to a high temperature environment. Uncoated fabric woven from silicon carbide yarn has an open surface with a high catalytic efficiency and an emissivity of only about 0.61 at 1200° C. These two factors contribute to the failure of the fabric at temperatures equal to or exceeding 1370° C. in a convective heating environment. When silicon carbide fabric is coated with the protective coating of this invention, the open surface is sealed. As a result, the catalytic efficiency is remarkably decreased and the emissivity of the surface is increased to about 0.74 at 1200° C. As a result, the fabric does not fail, and the surface temperatures are significantly lower when subjected to the same heating environment as the uncoated fabric.

In another embodiment, the protective coating of this invention can be utilized as a high temperature adhesive to bond metallic foils to ceramic fabrics and composite insulations such as those described in U.S. Pat. No. 5,038,693 (CFBI) and in Report 177444 (TABI). The combined metallic foil-protective coating of this invention and underlying ceramic fabric and/or composite insulation provides a thermal control structure having a smooth and water proof surface on the ceramic fabric and/or composite insulation. Such a smooth skin surface advantageously minimizes local heating caused by tripping of the hot gass laminar flow boundary layer on the surface subjected to hypersonic earth entry speeds of a space vehicle. This type of thermal control structure also provides resistance to hot gas ingress and flow within or between layers of fabrics/composite insulations and prevents overheating of the underlying primary structure.

Metallic foils for use in the present invention include high temperature metallic foils resistant to high temperature oxidation. Specific non-limiting examples include titanium and titanium alloys such as Titanium Beta 21S, nickel and nickel alloys such as Hastelloy C and Inconel X, molybdenum and molybdenum alloys, tungsten and tungsten alloys, platinum, gold or any other type of metal or alloy which substantially resists oxidation at the bonding temperature 1300° F. (704° C.) of the protective coating of this invention. Oxidation of the metallic foils can also be prevented by bonding the structure in an inert atmosphere such as nitrogen. The metallic foil preferably has a thickness of from 0.007 to 0.07 mm.

When used as a high temperature adhesive, the protective coating of this invention may be applied to a ceramic fabric, or composite insulation or felt as described above in an ambient air dried coating weight of from 0.01 to 0.05 g/cm², and preferably from 0.01 to 0.03 g/cm². The metal foil is placed on top of the ambient air dried coating, and a ceramic plate (e.g., Fiberfrax) exerting a pressure of, e.g., 3 to 4 psi is placed on top to ensure intimate contact of the coating with the metal foil. The assembly is placed in an air or nitrogen furnace and heated to about 1300° F. (704° C.) for about 10 minutes to provide secure adhesion of the ceramic fabric/coating/metal foil. The assembly is then removed from the furnace and allowed to cool to room temperature.

The protective coating of this invention is further modified to bond metal foils to ceramic fabrics at ambient temperatures. As an example, a preferred formulation includes a composition of 10% by weight of the coating shown in Example 2 below, 30% by weight aluminum dioxide powder, 50% by weight colloidal alumina and 10% by weight sodium silicate. The modified protective coating-adhesive is applied on the ceramic fabric at the same weight per unit area and method as described above. A metal foil is placed on top of the adhesive and the assembly is placed in a vacuum bag connected to a vacuum pump exerting a pressure of 2-5 inches of mercury and preferably 3-4 inches Hg. The assembly is held under this pressure for a minimum of three hours and a maximum of six hours and preferably for four hours. The assembly is then removed from the vacuum bag. The vacuum bag set-up allows the metal foil to completely enclose and bond on the top, sides and bottom surfaces of the ceramic fabric surrounding the insulation, thus providing a completely waterproof composite insulation.

A thermal control structure comprising a metallic foil bonded to the ceramic fabric outer cover of a composite insulation by the protective coating of this invention provides a water proof surface which is also smooth and resistant to damage due to fluttering or tears resulting from hypersonic entries. The limitations of the surface are due to the temperature limitations of the metallic foil such as Hastelloy having an upper temperature limitation of about 2700° F. (1482° C.). Higher temperatures can be achieved with foils such as platinum, but the cost is excessive.

Figure 3:
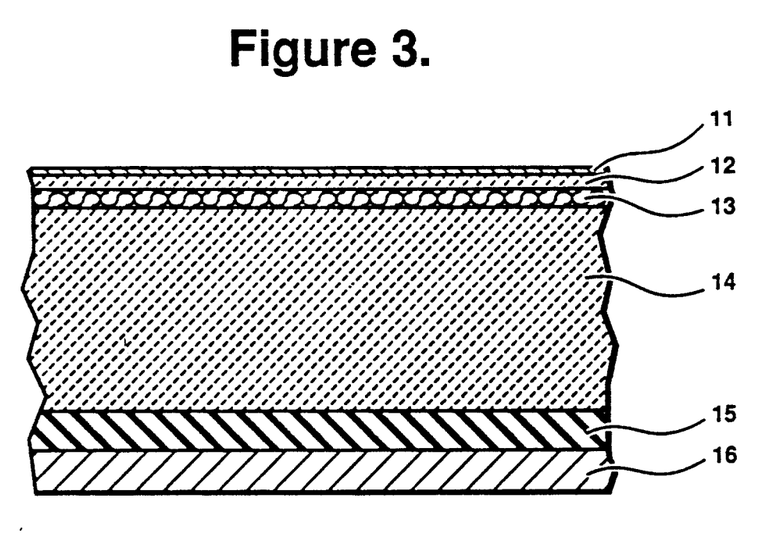
FIG. 3 is a cross section of a thermal control structure (not to scale) employing the protective coating of this invention as a high temperature adhesive to bond a metallic foil to a ceramic fabric outer cover of a composite insulation.

An example of a thermal control structure in accordance with the present invention comprising a metallic foil bonded to the surface of a ceramic fabric outer cover of a composite insulation using the protective coating of the present invention is depicted in cross-sectional view (not to scale) in FIG. 3. The thermal control structure of FIG. 3 includes metallic foil 11 ceramic fabric 13 coated on top with the protective coating 12 of this invention and composite insulation (AFRSI) 14, which thermal control structure is bonded to vehicle structure 16 by a suitable adhesive 15 such as RTV. The protective coating bonds the metallic foil 11 to the ceramic fabric 13.

The present invention will be further described by way of the following Examples to illustrate aspects of this invention, which Examples are not intended to limit the scope or applicability of this invention.

EXAMPLE 1

A protective ceramic coating of this invention was prepared as follows: 14.7 grams of silicon hexaboride powder and 206.0 grams of silicon dioxide powder were added to 178.5 grams of deionized water and 211.0 grams of a suspension of deionized water containing 40% by weight of colloidal silicon dioxide particles (Ludox AS). The mixture was poured into an 1100 cm$^3$ (size 00) aluminum oxide jar containing 341 aluminum oxide cylinders ($\frac{1}{2} \times \frac{1}{2}$") and placed on a variable speed roller type jar mill for about 5 hrs. at about 81 rpm. Upon completion of ball milling, the jar was immediately emptied into a plastic bottle and rotated continuously on a Kendall mixer until just prior to use.

EXAMPLE 2

The protective coating of Example 1 was diluted by the addition of 20% by weight of deionized water and mixed in a Kendall mixer to obtain a slurry containing about 50 wt % solids and having the composition given below.

| MATERIAL | AMOUNT (GRAMS) | DENSITY | VOLUME (cm$^3$) | CONTENT (wt %) |
| --- | --- | --- | --- | --- |
| silicon dioxide | 206.0 | 2.69 | 76.6 | 33.8 |
| silicon | 14.7 | 2.42 | 6.1 | 2.4 |

-continued

| MATERIAL | AMOUNT (GRAMS) | DENSITY | VOLUME (cm$^3$) | CONTENT (wt %) |
| --- | --- | --- | --- | --- |
| hexaboride | | | | |
| Ludox AS* | 211.0 | 1.30 | 162.3 | 34.6 |
| deionized water | 178.5 | 1.0 | 178.5 | 29.2 |

*Ludox AS is deionized water containing 40 wt % SiO$_2$ colloidal particles.

EXAMPLE 3

Two similar CFBI flexible composite ceramic insulations having a dimension of 3.5"×3.5" (8.9 cm×8.9 cm) were prepared as described in Kourtides et al, "Composite Flexible Insulation for Thermal Protection of Space Vehicles", *NASA Technical Memorandum* 103836 (February 1991). The CFBI insulations thus prepared consisted of an outer layer of silicon carbide fabric, followed by alumina mat insulation, and alternating layers of aluminized polyimide film and aluminoborosilicate scrim fabric. The outer layer silicon carbide fabric had a thickness of 0.065 cm, and was prepared from Nicalon NLM 202, five harness satin weave, sizing M, yarn count 1260 Wrap×670 fill per m, 600 denier, fabric weight 570 g m$^2$, yarn ply factor $\frac{1}{4}$, 1.5×10$^3$ filaments per m$^2$. The protective coating of Example 2 was applied to the silicon carbide fabric surface of one of the above described CFBI insulations using a spray gun in a coating weight of 2.00 g to provide a coverage of about 0.025 g/cm$^2$. The total volume of the coating was about 0.8 cm$^3$ (assuming that the coating had a green density of 100% of the theoretical density, i.e., no pores). The protective coating was dried in air and had a dry thickness of about 0.004 inch (0.1 mm). The insulations had a thickness of about 1 inch (2.5 cm). A calibration sample of the same dimensions was also prepared consisting of a fibrous refractory composite insulation (FRCI-I2) coated with reaction cured glass (RCG) coating as described in U.S. Pat. No. 4,093,771.

Thus, three test models were prepared, namely: (1) a calibration model consisting of a fibrous refractory composite insulation (FRCI-12) coated with a reaction cured glass (RCG) coating as described in U.S. Pat. No. 4,093,771; (2) a composite flexible blanket insulation (CFBI) prepared as described above and labelled Model #307; and (3) a CFBI similar to (2), but coated with the protective coating of this invention as described above and labelled Model #307C. Each of the test models had dimensions of approximately 3.5"×3.5"×1", (8.9 cm×8.9 cm×2.5 cm) and were insulated on the perimeter with FRCI-12 in order to minimize edge effects.

The test models thus prepared were tested in the NASA Ames 20 MW Plasma Arc facility. The facility is described in Leiser et al, "Options for Improving Rigidized Ceramic Heatshiels", *American Ceramic Society Bulletin*, Vol. 3, No. 22, pp. 29-33 (1985). The test procedure used and the details of the model geometry are described in Kourtides et al. The objective of the Plasma Arc test was to determine the surface temperature of coated and uncoated insulations at temperature and pressure conditions predicated for an aerospace vehicle. The tests were conducted by subjecting the test models to the Plasma Arc to achieve a RCG surface temperature of 2500° F. (1370° C.) for 120 seconds in the calibration model. This equated to a heat flux of approximately 31.1 Btu/ft$^2$·s (353 kw/m$^2$).

Figure 2:
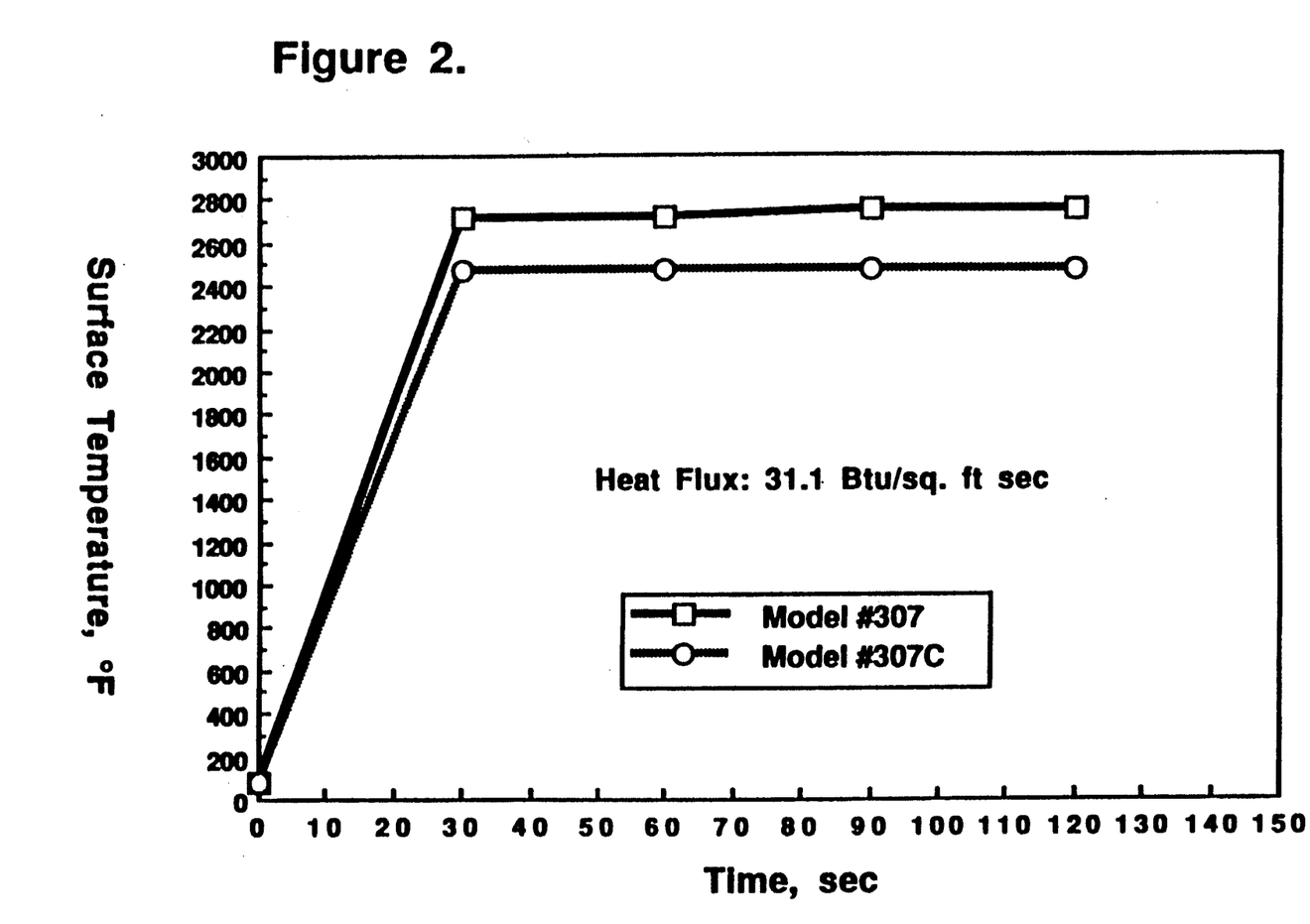
FIG. 2 is a graphical presentation of the results of Example 3 herein showing surface temperature as a function of time of composite flexible blanket insulation (CFBI) subjected to temperature and pressure conditions predicated for an aerospace vehicle. Model #307 was uncoated Model #307C was coated with the protective coating of this invention.

The same test conditions were utilized to test Models #307 (uncoated) and Model #307C (coated). The test models were inserted into the Plasma Arc stream for 120 seconds each in separate tests. The surface temperatures of the uncoated and coated insulations, which were measured using a calibrated pyrometer, are shown in FIG. 2. The maximum surface temperature of Model #307 (uncoated) was 2752° F. (1511° C.), and that of Model #307C (coated) was 2476° F. (1357° C.). The test models were further evaluated after removal from the Plasma Arc stream. Small holes were found in the surface of Model #307 (uncoated), but Model #307C (coated) was undamaged indicating that he coating effectively protected the underlying silicon carbide fabric. This is attributed to the increased emittance of the coated fabric which results in a superior insulation with a lower backface temperature.

Figure 4:
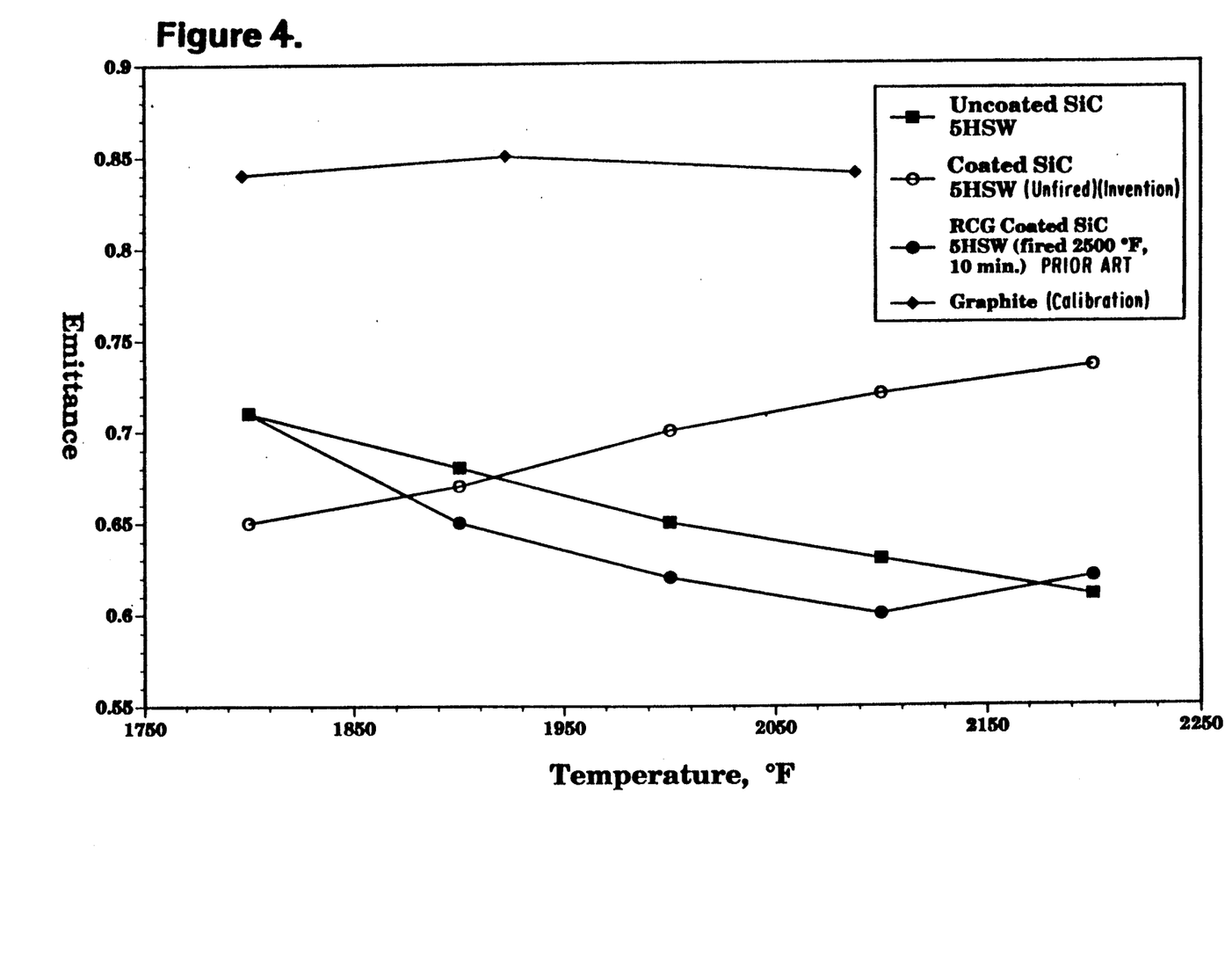
FIG. 4 is a graphical presentation of the results of emissivity tests at high temperatures of three fabrics and graphite, including uncoated silicon carbide five (5) harness satin weave fabric, a similar fabric coated with the protective coating of this invention, a similar fabric coated with the prior art reaction cured glass, and graphite used for calibration. The graph shows the emittance of the three fabrics and graphite as a function of temperature.

As can be seen in FIG. 2, the maximum surface temperature for Model #307C (coated) was 2476° F. (1357° C.) which is lower than that of the calibration model coated with RCG. This result is due to the lower emittance of the fabric coated in accordance with this invention. As shown in FIG. 4, this fabric has an emittance equal to or higher than 0.74 compared to an emittance of 0.63 for RCG at a similar temperature of 2200° F. Thus, the protective coating of this invention is at least equal or better in reducing the surface temperature of a ceramic fabric without the limitations of the prior art.

EXAMPLE 4

Three similar silicon carbide fabrics (Nicalon NLM 202, five (5) harness satin weave) were evaluated with respect to hemispherical emittance at temperatures of 1800° F., 1900° F., 2000° F., 2100° F. and 2200° F. The first fabric was untreated. The second fabric was coated with the protective coating of Example 2 to provide a coverage of about 0.02 g/cm². The third fabric was coated with the prior art RCG coating. A fourth material, graphite sheet of known 0.85 emissivity, was also tested for calibration purposes. A concentric cylinder system was used to measure the hemispherical emittance of the silicon carbide fabrics. Particularly, the fabric was applied to the outer surface of an inner cylinder and instrumented with surface thermocouples. A high temperature electric heater was located inside the inner cylinder, supplying the heat to be transferred in the system. The inner cylinder was surrounded by a larger diameter, second cylinder whose surface temperatures were also measured with attached thermocouples. A third, still larger diameter cylinder surrounded the second cylinder to complete the concentric cylinder system. The concentric cylinder system was then positioned under a stainless steel vacuum bell jar to allow a hard vacuum to be maintained. The electric heat emitted by the central heater was monitored by laboratory standard volt and ammeters. A thermocouple pressure gauge indicated the vacuum level that existed in the test system.

The fundamental equation relating to the interreflection radiant energy transfer and the emissivities is given below.

$$\left(\frac{q}{A}\right)_{rad} = \frac{\sigma}{\frac{1}{\epsilon_1} + \frac{A_1}{A_2}\left(\frac{1}{\epsilon_2} - 1\right)}[T_1^4 - T_1^4]$$

where:
$\sigma$, Stefan Boltzman constant
$\epsilon_1$, gray body emissivity of inner cylinder surface (test fabric)
$\epsilon_2$, gary body emissivity of surrounding cylinder surface
$T_1$, absolute surface temperature of inner cylinder surface (test fabric)
$T_2$, absolute surface temperature of surrounding cylinder surface
$A_1$, radiating area of inner cylinder
$A_2$, radiating area of surrounding cylinder The radiation flux, $(q/A)_{rad}$, was determined from the heat output of the electric heater, as corrected for a hard vacuum gas conduction term. The results are shown in FIG. 4.

As can be seen in FIG. 4, the emittance of the uncoated silicon carbide fabric decreases as the temperature increases. On the other hand, the emittance of the silicon carbide fabric coated with the protective coating of this inventions is substantially increased with an increase in temperature. As a result, when subjected to a high temperature environment, the protective coating of this invention lowers the surface temperature of the thermal control structure and reduces heat transfer through the surface such that the underlying ceramic material is protected from degradation. The prior art RCG coating shows a slower emissivity at high temperatures and thus produces higher surface temperatures in a heating environment.

It should further be apparent to those skilled in the art that various changes in form and detail of the invention as shown and described above may be made. It is intended that such changes be included within the spirit and scope of the claims appended hereto.

What is claimed is:

1. A protective coating for a ceramic material comprising, in admixture, silicon dioxide power in an amount of from 23.0 to 44.0 wt %; collodial silicon dioxide in an amount from 25.0 to 45.0 wt %, water in an amount from 19.0 to 39.0 wt %; and one or more emittance agents selected from the group consisting of silicon tetraboride, silicon hexaboride, silicon carbide, molybdenum disilicide, tungsten disilicide and zirconium diboride; wherein said protective coating has a solids content of from 45 to 55 wt %.

2. The protective coating as in claim 1, wherein the emittance agent is silicon hexaboride.

3. The protective coating as in claim 1, further comprising colloidal alumina.

4. The protective coating as in claim 1, further comprising aluminum oxide powder.

5. The protective coating as in claim 1, wherein the silicon dioxide powder has a particle size of from 1.0 to 2.0 μm.

6. The protective coating as in claim 1, wherein the water is deionized water.

7. The protective coating as in claim 2, wherein the silicon hexaboride is in a form of a powder having a particle size of from 5.0 to 6.0 μm.

8. The protective coating as in claim 1, wherein the protective coating does not contain an organic binder.

9. The protective coating as in claim 1, containing silicon hexaboride in an amount of from 0.5 to 4.5 wt %.

10. The protective coating as in claim 3, containing colloidal alumina (as Al₂O₃) in an amount of from 1.0 to 20.0 wt %; and silicon hexaboride in an amount of from 0.5 to 3.5 wt %.

11. A thermal control structure comprising a ceramic material having coated thereon a protective coating comprising, in admixture, silicon dioxide powder in an amount of from 23.0 to 44.0 wt %; colloidal silicon dioxide in an amount from 25.0 to 45.0 wt %; water in an amount from 19.0 to 39.0 wt %; and one or more emittance agents selected from the group consisting of silicon tetraboride, silicon hexaboride, silicon carbide, molybdenum disilicide, tungsten disilicide and zirconium diboride.

12. The thermal control structure as in claim 11, wherein the ceramic material is a fibrous ceramic material in a form selected from the group consisting of a felt, thread, tow, woven yarn and fabric.

13. The thermal control structure as in claim 11, wherein the ceramic material is a flexible ceramic fabric.

14. The thermal control structure as in claim 11, wherein the ceramic material is made of fibers selected from the group consisting of silicon carbide fibers, aluminium oxide fibers, zirconium oxide fibers, aluminoborosilicate fibers and silicon dioxide fibers.

15. The thermal control structure as in claim 11, further comprising a metallic foil bonded to the ceramic material via the protective coating.

16. A thermal control structure comprising a composite insulation comprising a ceramic fabric outer covering having coated on the outer surface of the ceramic fabric a protective coating comprising, in admixture, silicon dioxide powder in an amount of from 23.0 to 44.0 wt %; colloidal silicon dioxide in an amount from 25.0 to 45.0 wt %; water in an amount from 19.0 to 39.0 wt %; and one or more emittance agents selected from the group consisting of silicon tetraboride, silicon hexaboride, silicon carbide, molybdenum disilicide, tungsten disilicide and zirconium diboride.

17. The thermal control structure as in claim 16, further comprising a metallic foil bonded to the outer surface of the ceramic fabric via the protective coating.

18. The thermal control structure as in claim 17, wherein the metallic foil is selected from the group consisting of titanium and its alloys, nickel and its alloys, molybdenum and its alloys, tungsten and its alloys, tantalum and its alloys, platinum and gold.

19. The thermal control structure as in claim 16, wherein the protective coating further comprises aluminum oxide powder, colloidal alumina and sodium silicate.

20. The thermal control structure as in claim 19, further comprising a metallic foil bonded to the outer surface of the ceramic fabric via the protective coating, wherein the metallic foil is selected from the group consisting of titanium and its alloys, nickel and its alloys, molybdenum and its alloys, tungsten and its alloys, tantalum and its alloys, platinum and gold.

* * * * *